US012623282B2

(12) United States Patent
Takahashi

(10) Patent No.: US 12,623,282 B2
(45) Date of Patent: May 12, 2026

(54) METHOD FOR PRODUCING COMPOSITE MAGNETIC BODY, MAGNETIC POWDER, COMPOSITE MAGNETIC BODY AND COIL COMPONENT

(71) Applicant: Panasonic Intellectual Property Management Co., Ltd., Osaka (JP)

(72) Inventor: Takeshi Takahashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 792 days.

(21) Appl. No.: 17/835,252

(22) Filed: Jun. 8, 2022

(65) Prior Publication Data

US 2022/0324018 A1 Oct. 13, 2022

Related U.S. Application Data

(62) Division of application No. 16/496,835, filed as application No. PCT/JP2018/010689 on Mar. 19, 2018, now Pat. No. 11,651,892.

(30) Foreign Application Priority Data

Mar. 31, 2017 (JP) ................................ 2017-070893

(51) Int. Cl.
*B22F 1/16* (2022.01)
*B22F 3/10* (2006.01)
(Continued)

(52) U.S. Cl.
CPC ................ *B22F 1/16* (2022.01); *B22F 3/101* (2013.01); *B22F 3/1017* (2013.01); (Continued)

(58) Field of Classification Search
CPC ...... B22F 1/16; H01F 27/255; H01F 1/14783; H01F 1/24; H01F 5/00; H01F 3/08
See application file for complete search history.

(56) References Cited

U.S. PATENT DOCUMENTS

2016/0336104 A1 11/2016 Noguchi et al.

FOREIGN PATENT DOCUMENTS

JP 2001-85211 A 3/2001
JP 2005-146315 A 6/2005
(Continued)

OTHER PUBLICATIONS

Office Action mailed on Jun. 21, 2022 for the corresponding U.S. Appl. No. 16/496,835.

(Continued)

*Primary Examiner* — C Melissa Koslow
(74) *Attorney, Agent, or Firm* — Rimon P.C.

(57) ABSTRACT

A method for producing a composite magnetic body includes: pressure molding a metal magnetic material into a predetermined shape, the metal magnetic material being an Fe—Si-based metal magnetic material; performing a primary heat treatment of heating the metal magnetic material in an atmosphere with a first oxygen partial pressure to form an Si oxide coating film on a surface of the metal magnetic material; and performing a secondary heat treatment of heating the metal magnetic material that has undergone the primary heat treatment in an atmosphere with a second oxygen partial pressure, which is higher than the first oxygen partial pressure, to form an Fe oxide layer at least partially on a surface of the Si oxide coating film.

3 Claims, 7 Drawing Sheets

(51) Int. Cl.

| | |
|---|---|
| ***B22F 3/24*** | (2006.01) |
| ***H01F 1/147*** | (2006.01) |
| ***H01F 1/20*** | (2006.01) |
| ***H01F 1/24*** | (2006.01) |
| ***H01F 1/33*** | (2006.01) |
| ***H01F 3/08*** | (2006.01) |
| ***H01F 5/00*** | (2006.01) |
| ***H01F 27/255*** | (2006.01) |

(52) U.S. Cl.
CPC .......... *H01F 1/14783* (2013.01); *H01F 1/24* (2013.01); *H01F 3/08* (2013.01); *H01F 5/00* (2013.01); *H01F 27/255* (2013.01); *B22F 2003/247* (2013.01); *H01F 1/20* (2013.01); *H01F 1/33* (2013.01)

(56) References Cited

FOREIGN PATENT DOCUMENTS

| | | | |
|---|---|---|---|
| JP | 2009-158652 A | | 7/2009 |
| JP | 2011-233827 | * | 11/2011 |
| JP | 2011-233827 A | | 11/2011 |
| JP | 2012-043959 A | | 3/2012 |
| JP | 2016-086124 A | | 5/2016 |

OTHER PUBLICATIONS

Office Action and Search Report mailed on Jan. 26, 2025 for the corresponding Chinese patent application No. 202210154356.5, w/ English Translation of Search Report.

International Search Report issued in corresponding International Patent Application No. PCT/JP2018/010689, dated Jun. 5, 2018, with English translation.

Office Action with Search Report issued in corresponding Chinese Patent Application No. 201880021147.5, dated Jul. 21, 2020, with partial English translation.

Chinese Office Action with Search Report dated Apr. 13, 2021 issued in corresponding Chinese Patent Application No. 201880021147.5, with English translation of Search Report.

* cited by examiner

FIG. 4

| SAMPLE NO. | HEAT TREATMENT CONDITIONS | INITIAL MAGNETIC PERMEABILITY | LOSS ($kW/m^3$) | REMARKS |
|---|---|---|---|---|
| 1 | PRIMARY HEAT TREATMENT. $\alpha = 1.0 \times 10^{-5}$, 700°C, 0.5 h<br>SECONDARY HEAT TREATMENT. $\alpha = 1.9 \times 10$, 900°C, 1.0 h | 145 | 890 | EXAMPLE |
| 2 | $\alpha = 1.0 \times 10^{-5}$, 900°C, 1.0 h | 76 | 5900 | COMPARATIVE EXAMPLE |
| 3 | $\alpha = 1.9 \times 10$, 900°C, 1.0 h | 31 | 22000 | COMPARATIVE EXAMPLE |
| 4 | NITROGEN ATMOSPHERE, 900°C, 1.0 h | 51 | 18500 | COMPARATIVE EXAMPLE |

FIG. 5

| SAMPLE NO. | HEAT TREATMENT CONDITIONS | | | | | | INITIAL MAGNETIC PERMEABILITY | LOSS ($kW/m^3$) | REMARKS |
|---|---|---|---|---|---|---|---|---|---|
| | PRIMARY HEAT TREATMENT | | | SECONDARY HEAT TREATMENT | | | | | |
| | α | TEMPERATURE/℃ | TIME / h | α | TEMPERATURE/℃ | TIME / h | | | |
| 5 | $4.5 \times 10^{-6}$ | 400 | 1.0 | 5.0 × 10 | 850 | 0.5 | 98 | 6200 | COMPARATIVE EXAMPLE |
| 6 | $4.5 \times 10^{-6}$ | 500 | 1.0 | 5.0 × 10 | 850 | 0.5 | 139 | 900 | EXAMPLE |
| 7 | $4.5 \times 10^{-6}$ | 700 | 1.0 | 5.0 × 10 | 850 | 0.5 | 140 | 820 | EXAMPLE |
| 8 | $4.5 \times 10^{-6}$ | 800 | 1.0 | 5.0 × 10 | 850 | 0.5 | 135 | 850 | EXAMPLE |
| 9 | $4.5 \times 10^{-6}$ | 850 | 1.0 | 5.0 × 10 | 850 | 0.5 | 86 | 4200 | COMPARATIVE EXAMPLE |
| 10 | $5.2 \times 10^{-5}$ | 500 | 1.0 | 5.0 × 10 | 850 | 0.5 | 130 | 950 | EXAMPLE |
| 11 | $5.2 \times 10^{-5}$ | 600 | 1.0 | 5.0 × 10 | 850 | 0.5 | 130 | 810 | EXAMPLE |
| 12 | $5.2 \times 10^{-5}$ | 700 | 1.0 | 5.0 × 10 | 850 | 0.5 | 138 | 800 | EXAMPLE |
| 13 | $5.0 \times 10^{-4}$ | 300 | 1.0 | 5.0 × 10 | 850 | 0.5 | 78 | 7400 | COMPARATIVE EXAMPLE |
| 14 | $5.0 \times 10^{-4}$ | 500 | 1.0 | 5.0 × 10 | 850 | 0.5 | 120 | 930 | EXAMPLE |
| 15 | $5.0 \times 10^{-4}$ | 700 | 1.0 | 5.0 × 10 | 850 | 0.5 | 120 | 890 | EXAMPLE |
| 16 | $5.0 \times 10^{-4}$ | 800 | 1.0 | 5.0 × 10 | 850 | 0.5 | 119 | 1000 | EXAMPLE |
| 17 | $5.0 \times 10^{-4}$ | 850 | 1.0 | 5.0 × 10 | 850 | 0.5 | 69 | 6500 | COMPARATIVE EXAMPLE |
| 18 | $3.8 \times 10^{-6}$ | 500 | 1.0 | 5.0 × 10 | 850 | 0.5 | 97 | 5900 | COMPARATIVE EXAMPLE |
| 19 | $3.2 \times 10^{-6}$ | 800 | 1.0 | 5.0 × 10 | 850 | 0.5 | 89 | 4800 | COMPARATIVE EXAMPLE |
| 20 | $4.2 \times 10^{-3}$ | 500 | 1.0 | 5.0 × 10 | 850 | 0.5 | 69 | 7000 | COMPARATIVE EXAMPLE |
| 21 | $4.2 \times 10^{-3}$ | 800 | 1.0 | 5.0 × 10 | 850 | 0.5 | 60 | 8200 | COMPARATIVE EXAMPLE |

FIG. 6

| SAMPLE NO. | HEAT TREATMENT CONDITIONS | | | | | | INITIAL MAGNETIC PERMEABILITY | LOSS (kW/m³) | REMARKS |
|---|---|---|---|---|---|---|---|---|---|
| | PRIMARY HEAT TREATMENT | | | SECONDARY HEAT TREATMENT | | | | | |
| | α | TEMPERATURE/℃ | TIME / h | α | TEMPERATURE/℃ | TIME / h | | | |
| 22 | $9.0 \times 10^{-6}$ | 600 | 1.0 | $4.5 \times 10^{-3}$ | 500 | 1.0 | 91 | 2200 | COMPARATIVE EXAMPLE |
| 23 | $9.0 \times 10^{-6}$ | 600 | 1.0 | $4.5 \times 10^{-3}$ | 600 | 1.0 | 133 | 850 | EXAMPLE |
| 24 | $9.0 \times 10^{-6}$ | 600 | 1.0 | $4.5 \times 10^{-3}$ | 700 | 1.0 | 142 | 780 | EXAMPLE |
| 25 | $9.0 \times 10^{-6}$ | 600 | 1.0 | $4.5 \times 10^{-3}$ | 1000 | 1.0 | 120 | 890 | EXAMPLE |
| 26 | $9.0 \times 10^{-6}$ | 600 | 1.0 | $4.5 \times 10^{-3}$ | 1100 | 1.0 | 69 | 6300 | COMPARATIVE EXAMPLE |
| 27 | $9.0 \times 10^{-6}$ | 600 | 1.0 | $1.4 \times 10^{-2}$ | 700 | 1.0 | 139 | 800 | EXAMPLE |
| 28 | $9.0 \times 10^{-6}$ | 600 | 1.0 | $1.4 \times 10^{-2}$ | 800 | 1.0 | 140 | 810 | EXAMPLE |
| 29 | $9.0 \times 10^{-6}$ | 600 | 1.0 | $1.4 \times 10^{-2}$ | 900 | 1.0 | 138 | 910 | EXAMPLE |
| 30 | $9.0 \times 10^{-6}$ | 600 | 1.0 | $2.1 \times 10$ | 700 | 1.0 | 130 | 790 | EXAMPLE |
| 31 | $9.0 \times 10^{-6}$ | 600 | 1.0 | $2.1 \times 10$ | 800 | 1.0 | 132 | 800 | EXAMPLE |
| 32 | $9.0 \times 10^{-6}$ | 600 | 1.0 | $2.1 \times 10$ | 950 | 1.0 | 125 | 900 | EXAMPLE |
| 33 | $9.0 \times 10^{-6}$ | 600 | 1.0 | $6.0 \times 10^{3}$ | 400 | 1.0 | 90 | 3000 | COMPARATIVE EXAMPLE |
| 34 | $9.0 \times 10^{-6}$ | 600 | 1.0 | $6.0 \times 10^{3}$ | 600 | 1.0 | 110 | 1200 | EXAMPLE |
| 35 | $9.0 \times 10^{-6}$ | 600 | 1.0 | $6.0 \times 10^{3}$ | 800 | 1.0 | 100 | 1000 | EXAMPLE |
| 36 | $9.0 \times 10^{-6}$ | 600 | 1.0 | $6.0 \times 10^{3}$ | 1000 | 1.0 | 97 | 1700 | EXAMPLE |
| 37 | $9.0 \times 10^{-6}$ | 600 | 1.0 | $6.0 \times 10^{3}$ | 1050 | 1.0 | 72 | 7800 | COMPARATIVE EXAMPLE |
| 38 | $9.0 \times 10^{-6}$ | 600 | 1.0 | $1.4 \times 10^{-3}$ | 600 | 1.0 | 89 | 2500 | COMPARATIVE EXAMPLE |
| 39 | $9.0 \times 10^{-6}$ | 600 | 1.0 | $1.4 \times 10^{-3}$ | 1000 | 1.0 | 77 | 4500 | COMPARATIVE EXAMPLE |
| 40 | $9.0 \times 10^{-6}$ | 600 | 1.0 | $1.0 \times 10^{4}$ | 600 | 1.0 | 80 | 3800 | COMPARATIVE EXAMPLE |
| 41 | $9.0 \times 10^{-6}$ | 600 | 1.0 | $1.0 \times 10^{4}$ | 1000 | 1.0 | 65 | 6200 | COMPARATIVE EXAMPLE |

METHOD FOR PRODUCING COMPOSITE MAGNETIC BODY, MAGNETIC POWDER, COMPOSITE MAGNETIC BODY AND COIL COMPONENT

CROSS-REFERENCE OF RELATED APPLICATIONS

This application is a Divisional of U.S. patent application Ser. No. 16/496,835, filed on Sep. 23, 2019, now U.S. Pat. No. 11,651,892, which in turn claims the benefit of the U.S. National Phase under 35 U.S.C. § 371 of International Patent Application No. PCT/JP2018/010689, filed on Mar. 19, 2018, which in turn claims the benefit of Japanese Application No. 2017-070893, filed on Mar. 31, 2017, the entire disclosures of which Applications are incorporated by reference herein.

TECHNICAL FIELD

The present disclosure relates to a method for producing a composite magnetic body, a magnetic powder, a composite magnetic body, and a coil component.

BACKGROUND ART

Conventionally, metal magnetic materials and oxide magnetic materials such as ferrite are used as magnetic materials for forming magnetic cores for use in inductors and transformers. A magnetic core made of ferrite has a small saturation magnetic flux density and poor DC superimposition characteristics. For this reason, in order to ensure DC superimposition characteristics, a ferrite magnetic core has a gap with several hundreds μm in a direction perpendicular to the magnetic path. However, such a wide gap serves as a beat noise generator, and also a leakage magnetic flux generated from the gap causes a significant increase in copper loss in a coil particularly in a high frequency band.

As magnetic cores made of metal magnetic material, there are a laminated magnetic core in which a silicon steel plate and the like are laminated, and a pressed powder magnetic core obtained by compression molding a metal powder. The laminated magnetic core is not suitable for use at high frequencies because it is difficult to form a thin steel plate and the loss caused by an eddy current is large at high frequencies.

In contrast, the pressed powder magnetic core has a saturation magnetic flux density much larger than that of the ferrite magnetic core, and it is therefore advantageous in terms of miniaturization. In addition, unlike the ferrite magnetic core, the pressed powder magnetic core can be used without a gap. Accordingly, the beat noise and the copper loss caused by a leakage magnetic flux are small. Furthermore, the pressed powder magnetic core can be formed through molding, and thus has a high degree of freedom in the product shape. Also, even a pressed powder magnetic core with a complex shape can be produced with a simple process, and thus attention is paid to the usability thereof (see, for example, Patent Literature (PTL) 1).

PTL 1 discloses a magnetic powder composed mainly of iron (Fe) and silicon (Si) as composite magnetic materials, and a pressed powder magnetic core. According to PTL 1, an insulating coating film is formed on the surface of a magnetic powder composed mainly of Fe and Si. The insulating coating film is obtained by subjecting the magnetic powder to an external oxidation treatment.

CITATION LIST

Patent Literature

PTL 1: Japanese Unexamined Patent Application Publication No. 2005-146315

SUMMARY OF THE INVENTION

Technical Problem

In order to impart high magnetic characteristics to a composite magnetic material, it is effective to perform a heat treatment at a high temperature in order to reduce the residual stress of the molded composite magnetic material. However, performing a heat treatment at a high temperature is problematic in that the insulating coating film formed on the surface of the metal magnetic material is damaged, and the size of the loop of eddy current increases, causing an increase in eddy current loss. For this reason, there has conventionally been a problem in that a heat treatment cannot be performed at a high temperature, and it is therefore difficult to impart high magnetic characteristics.

In view of the problem described above, it is an object of the present invention to provide a method for producing a composite magnetic body with high magnetic characteristics, a magnetic powder, a composite magnetic body, and a coil component.

Solutions to Problem

A method for producing a composite magnetic body according to one aspect of the present disclosure includes: pressure molding a metal magnetic material into a predetermined shape, the metal magnetic material being an Fe—Si-based metal magnetic material; performing a primary heat treatment of heating the metal magnetic material in an atmosphere with a first oxygen partial pressure to form an Si oxide coating film on a surface of the metal magnetic material; and performing a secondary heat treatment of heating the metal magnetic material that has undergone the primary heat treatment in an atmosphere with a second oxygen partial pressure, which is higher than the first oxygen partial pressure, to form an Fe oxide layer at least partially on a surface of the Si oxide coating film.

Also, a magnetic powder according to one aspect of the present disclosure includes: a metal magnetic material that is an Fe—Si-based metal magnetic material; an Si oxide coating film that covers a surface of the metal magnetic material; and an Fe oxide layer that is formed at least partially on a surface of the Si oxide coating film.

Also, a composite magnetic body according to one aspect of the present disclosure is a composite magnetic body, obtained by pressure molding a plurality of particles of the magnetic powder that has the above-described features into a predetermined shape.

Also, a coil component according to one aspect of the present disclosure includes: the composite magnetic body that has the above-described features; and a conductor that is wound around the composite magnetic body.

Advantageous Effect of Invention

According to the present disclosure, it is possible to provide a method for producing a composite magnetic body with high magnetic characteristics, a magnetic powder, a composite magnetic body, and a coil component.

BRIEF DESCRIPTION OF DRAWINGS

FIG. 4 is a diagram showing heat treatment conditions and magnetic characteristics of composite magnetic materials produced in Example 1 of Embodiment 1 and comparative examples.

FIG. 5 is a diagram showing heat treatment conditions and magnetic characteristics of composite magnetic materials produced in Example 2 of Embodiment 1 and comparative examples.

FIG. 6 is a diagram showing heat treatment conditions and magnetic characteristics of composite magnetic materials produced in Example 3 of Embodiment 1 and comparative examples.

DESCRIPTION OF EXEMPLARY EMBODIMENTS

Hereinafter, embodiments will be described specifically with reference to the drawings.

The embodiments given below show specific examples of the present disclosure. The numerical values, shapes, materials, structural elements, the arrangement and connection of the structural elements, steps, the order of the steps, and the like shown in the following embodiments are merely examples, and therefore are not intended to limit the scope of the present disclosure. Also, among the structural elements described in the following embodiments, structural elements not recited in any one of the independent claims are described as arbitrary structural elements.

Embodiment 1

1-1. Configuration of Composite Magnetic Body

A composite magnetic material according to the present embodiment is an Fe—Si-based metal magnetic material composed mainly of iron (Fe) and silicon (Si). Composite magnetic body 2 that is a composite magnetic body is formed by pressure molding the metal magnetic material into a predetermined shape. Also, coil component 1 is formed by winding conductor 3 around composite magnetic body 2.

Figure 1:
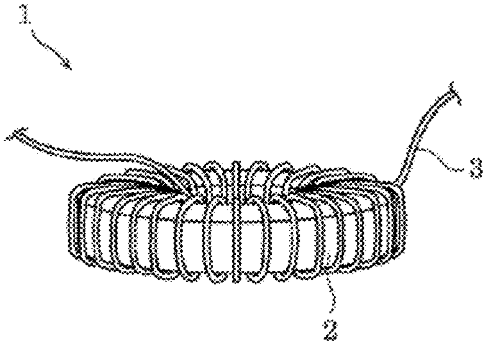
FIG. 1 is a schematic perspective view showing a configuration of a coil component according to Embodiment 1.
Figure 2:
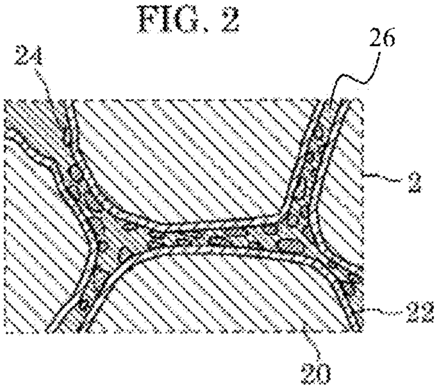
FIG. 2 is a cross-sectional view showing a configuration of a composite magnetic body according to Embodiment 1.

FIG. 1 is a schematic perspective view showing a configuration of coil component 1 according to the present embodiment. FIG. 2 is a cross-sectional view showing a configuration of composite magnetic body 2 according to Embodiment 1.

As shown in FIG. 1, coil component 1 includes composite magnetic body 2 made of a metal magnetic material and conductor 3 that is wound around composite magnetic body 2.

Composite magnetic body 2 is a magnetic core formed by pressure molding Fe—Si-based metal magnetic material 20. To be specific, composite magnetic body 2 is formed by pressure molding a plurality of metal magnetic material particles 20, with Si oxide coating film 22 being formed on the surface of each metal magnetic material particle 20 as shown in FIG. 2. Fe oxide layer 24 is formed at least partially on the surface of Si oxide coating film 22. Binder 26 made of resin or the like is present between metal magnetic material particles 20, and metal magnetic material particles 20 are bonded by binder 26. With the use of binder 26, the strength of composite magnetic body 2 can be improved. However, metal magnetic material particles 20 may be bonded without using binder 26. As shown in FIG. 2, Fe oxide layer 24 is formed between Si oxide coating films 22 that respectively cover the surfaces of adjacent metal magnetic material particles 20.

Fe—Si-based metal magnetic material 20 is a metal soft magnetic powder composed mainly of Fe and Si. Similar effects can be obtained even when metal magnetic material 20 contains inevitable impurities in addition to Fe and Si. In metal magnetic material 20 according to the present embodiment, Si is used in order to form Si oxide coating film 22 through a heat treatment and improve soft magnetic characteristics. The addition of Si provides advantageous effects of reducing the magnetic anisotropy and magnetostriction constant of metal magnetic material 20, and increasing electric resistance to reduce eddy current loss. Si is preferably added in an amount of 1 wt % or more and 8 wt % or less. If Si is added in an amount of less than 1 wt %, the advantageous effect of improving soft magnetic characteristics will be poor. If Si is added in an amount of greater than 8 wt %, saturation magnetization will decrease significantly, which reduces DC superimposition characteristics. In this case, in metal magnetic material 20, Fe is the remaining element in the composition other than Si.

There is no particular limitation on the method for producing metal magnetic material 20 according to the present embodiment, and various types of atomizing methods and various types of pulverized powders can be used.

Metal magnetic material 20 according to the present embodiment preferably has an average particle size of 1 μm or more and 100 μm or less. If the average particle size is less than 1 μm, the molded density will be low, and the magnetic permeability will decrease. If the average particle size is greater than 100 μm, the eddy current loss at high frequencies will be large. Metal magnetic material 20 more preferably has an average particle size of 50 μm or less. The average particle size of the metal soft magnetic powder is determined by a laser diffraction particle size distribution measurement method. For example, the particle size of a measurement particle that exhibits the same diffraction/scattered light pattern as a sphere with a diameter of 10 μm is determined to be 10 μm irrespective of the shape of the measurement particle. Then, counting is performed in ascending order of particle size, and the particle size at a cumulative 50% point is defined as the average particle size.

Si oxide coating film 22 is made of, for example, $SiO_2$. Si oxide coating film 22 is a coating film formed as a result of the surface of each Fe—Si-based metal magnetic material particle 20 being oxidized. Si oxide coating film 22 covers entirely the surface of each metal magnetic material particle 20. Metal magnetic material particles 20 are insulated by Si oxide coating film 22.

Fe oxide layer 24 is made of, for example, FeO, $Fe_2O_3$, $Fe_3O_4$, or the like. Fe oxide layer 24 is a layer formed as a result of Fe being deposited and reaching the surface of Si oxide coating film 22. Fe oxide layer 24 is formed at least partially on the surface of Si oxide coating film 22. Due to the presence of Fe oxide layer 24, Si oxide coating film 22 is reinforced, and thus is unlikely to be damaged. Accordingly, the insulation of metal magnetic material 20 is firmly maintained. Fe oxide layer 24 may cover entirely the surface of Si oxide coating film 22.

1-2. Method for Producing Composite Magnetic Body

Figure 3:
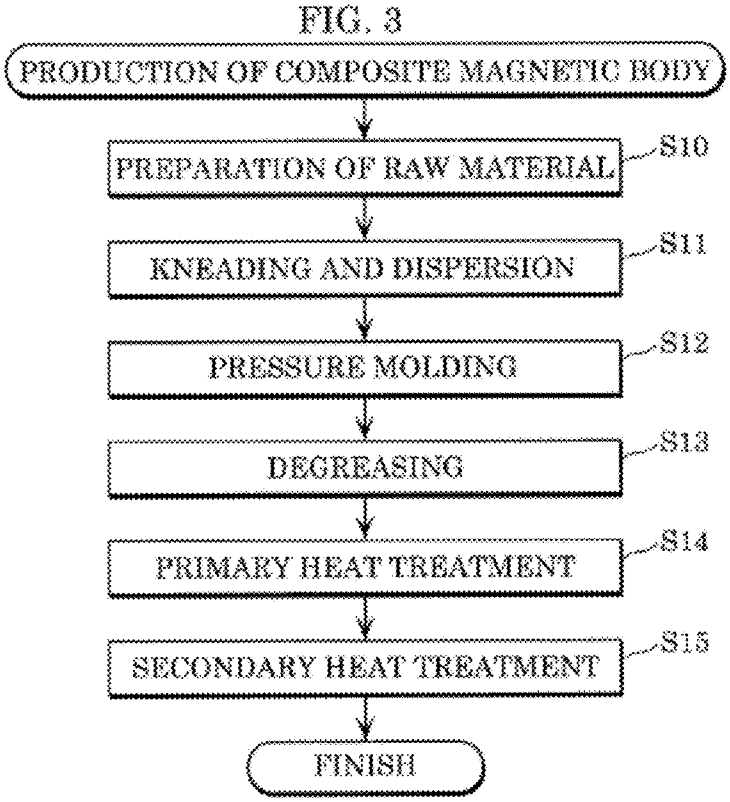
FIG. 3 is a flowchart illustrating a process for producing a composite magnetic body according to Embodiment 1.

Hereinafter, a method for producing composite magnetic body 2 according to the present embodiment will be described. FIG. 3 is a flowchart illustrating a process for producing composite magnetic body 2 according to the present embodiment.

As shown in FIG. 2, first, a raw material for making metal magnetic material 20 is prepared (step S10). As the raw material for making metal magnetic material 20, for example, a metal soft magnetic powder (Fe—Si metal powder) that is made of an alloy of Fe and Si, with an Si content of 1 wt % or more and 8 wt % or less, is used.

Also, a resin as a binder and an organic solvent for facilitating kneading and dispersion when pressure molding metal magnetic material 20 are also prepared. As the resin, for example, an acrylic resin, a butyral resin, or the like is used. Also, as the organic solvent, for example, toluene, ethanol, or the like is used.

Next, each of metal magnetic material 20, the resin, and the organic solvent is weighed. Then, metal magnetic material 20 is kneaded and dispersed (step S11). The kneading and dispersion of metal magnetic material 20 is performed by placing metal magnetic material 20, the resin, and the organic solvent that have been weighed in a container, and mixing and dispersing them by using a rotary ball mill. The kneading and dispersion of metal magnetic material 20 is not necessarily performed using a rotary ball mill, and any other mixing method may be used. The organic solvent is removed by drying metal magnetic material 20 after metal magnetic material 20 has been kneaded and dispersed.

Next, kneaded and dispersed metal magnetic material 20 is subjected to pressure molding (step S12). Step S12 is a pressure molding step. To be specific, first, kneaded and dispersed metal magnetic material 20 is placed in a mold and compressed to produce a molded article. At this time, for example, uniaxial molding is performed at a constant pressure of 6 ton/cm$^2$ or more and 20 ton/cm$^2$ or less. The molded article may have, for example, a cylindrical shape as with the shape of composite magnetic body 2 shown in FIG. 1.

After that, for example, in an inert gas atmosphere such as $N_2$ gas or in the air, the molded article is heated at a temperature of 200° C. or more and 450° C. or less so as to perform degreasing (step S13). Step S13 is a degreasing step. Through this treatment, the resin that is contained in the molded article and functions as a binder is removed.

Furthermore, degreased metal magnetic material 20 is subjected to a heat treatment. As the method for performing the heat treatment, for example, an atmosphere control electric furnace is used. Examples of the atmosphere control electric furnace include a box furnace, a tube furnace, a belt furnace, and the like. The method for performing the heat treatment is not limited thereto, and any other method may be used.

In the present embodiment, the heat treatment includes a primary heat treatment and a secondary heat treatment. The primary heat treatment and the secondary heat treatment use different oxygen partial pressures and heat treatment temperatures. As used herein, the oxygen partial pressure refers to the oxygen concentration in the oxidation atmosphere, and is represented by $P_{02}$ as a function of a shown in Equation 1 given below. According to Equation 1, the oxygen partial pressure increases as the value of α increases.

[Math. 1]

$$\log P_{02} = 2\log\left(2\sqrt{B}\right)^{-1} + 2\log\left\{(\alpha - 1) + \sqrt{(\alpha - 1)^2 + 4\alpha A^{-1}}\right\} \quad \text{Equation 1}$$

where $$A = e^{\left(\frac{-4335.19}{T}+3.737\right)},\ B = e^{\left(\frac{67972.74}{T}-20.69\right)},$$

T: absolute temperature, and $P_{02}$: oxygen partial pressure

In the primary heat treatment, the pressure molded Fe—Si metal powder is heated at a first oxygen partial pressure and a first temperature (step S14). α that defines the first oxygen partial pressure is set to $4.5\times10^{-6}$ or more and $5.0\times10^{-4}$ or less. The first temperature is set to 500° C. or more and 800° C. or less. The primary heat treatment time is set to several tens of minutes to several hours. For example, α may be set to $9.0\times10^{-6}$, the first temperature may be set to 600° C., and the primary heat treatment time may be set to 1 hour.

As a result of the primary heat treatment being performed, the strain of pressure molded metal magnetic material 20 is relieved, and Si oxide coating film 22 is formed on the surface of metal magnetic material 20. Si oxide coating film 22 is an $SiO_2$ film that has a thickness of, for example, about 10 nm. The thickness of Si oxide coating film 22 may be 1 nm or more and 200 nm or less. As a result of Si oxide coating film 22 being formed, oxidation is unlikely to further proceed in magnetic material 20, as a result of which metal magnetic material 20 is insulated by Si oxide coating film 22.

After that, the secondary heat treatment is performed successively after the primary heat treatment (step S15). In the secondary heat treatment, metal magnetic material 20 on which Si oxide coating film 22 has been formed is heated at a second oxygen partial pressure and a second temperature. The second oxygen partial pressure is an oxygen partial pressure that is higher than the first oxygen partial pressure. That is, α that defines the second oxygen partial pressure is a value greater than α defining the first oxygen partial pressure. Also, the second temperature is a temperature that is higher than the first temperature.

α defining the second oxygen partial pressure is set to $4.5\times10^{-3}$ or more and $6.0\times10^{3}$ or less. The second temperature is set to 600° C. or more and 1000° C. or less. The secondary heat treatment time is set to several tens of minutes to several hours. For example, α may be set to 5.0×10, the second temperature may be set to 850° C., and the secondary heat treatment time may be set to 0.5 hours.

Through the secondary heat treatment, Fe contained in metal magnetic material 20 is deposited on the surface of Si oxide coating film 22 that covers the surface of metal magnetic material 20, and Fe oxide layer 24 is formed at least partially on the surface of Si oxide coating film 22. Fe oxide layer 24 is formed in the form of, for example, islands with a thickness of about 50 nm on the surface of Si oxide coating film 22. The thickness of Fe oxide layer 24 may be 10 nm or more 200 nm or less. As a result of Fe oxide layer 24 being formed, Si oxide coating film 22 is reinforced by Fe oxide layer 24, and thus is unlikely to be damaged. After the secondary heat treatment, binder 26 may be impregnated. As binder 26, for example, an epoxy resin may be used. With the use of binder 26, the strength of composite magnetic body 2 can be improved.

Through the steps described above, composite magnetic body 2 in which the surface of metal magnetic material 20 is covered by Si oxide coating film 22, and Fe oxide layer 24 is formed at least partially on the surface of Si oxide coating film 22 is obtained.

Here, an example has been described in which the secondary heat treatment is performed successively after the primary heat treatment, but it is unnecessary to continuously increase the heat treatment temperature from the first temperature to the second temperature as long as the secondary heat treatment is performed after the primary heat treatment. For example, the heat treatment temperature may be temporarily dropped from the first temperature after the primary heat treatment, and thereafter increased to the second temperature in the secondary heat treatment through heating. Alternatively, composite magnetic body 2 may be temporarily exposed to the air between the primary heat treatment and the secondary heat treatment. Alternatively, the secondary heat treatment may be performed when a predetermined length of time elapses after the primary heat treatment.

1-3. Examples

Hereinafter, the first oxygen partial pressure and the first temperature used in the primary heat treatment, and the second oxygen partial pressure and the second temperature used in the secondary heat treatment will be described. In the examples given below, results were obtained by molding a plurality of different types of composite magnetic bodies 2 according to the production method described above while changing the oxygen partial pressure and the heat treatment temperature. Also, each composite magnetic body 2 obtained was evaluated in terms of oxygen partial pressure, heat treatment temperature, and magnetic characteristics. In the examples given below, combinations of values of the oxygen partial pressure and the heat treatment temperature are shown. Also, initial magnetic permeability and loss [$kW/m^3$] of each composite magnetic body 2 are shown as magnetic characteristics in the examples given below.

1-3-1. Example 1

In Example 1, evaluation was made on the effects obtained when the primary heat treatment and the secondary heat treatment were performed as the heat treatment performed on molded articles formed by pressure molding metal magnetic materials 20. FIG. 4 is a diagram showing heat treatment conditions and magnetic characteristics of composite magnetic materials of this example and comparative examples. In this example, as composite magnetic body 2, sample 1 shown in FIG. 4 was produced. The produced sample was a toroidal core that had an external diameter of 14 mm, an internal diameter of 10 mm, and a height of about 2 mm. In FIG. 4, samples 2 to 4 are composite magnetic bodies according to comparative examples.

Composite magnetic bodies 2 of samples 1 to 4 shown in FIG. 4 were formed under the following conditions.

First, for each of samples 1 to 4, a metal soft magnetic powder made of Si and Fe was prepared as a raw material for making metal magnetic material 20. The metal soft magnetic powder had a composition of 4.5 wt % Si and 95.5 wt % Fe. The metal soft magnetic powder had an average particle size of 20 μm.

Also, in each of samples 1 to 4, 0.8 parts by weight of acrylic resin was added to 100 parts by weight of the prepared metal soft magnetic powder. After that, a small amount of toluene was added thereto, and the resultant was kneaded and dispersed to obtain a mixture. Furthermore, the obtained mixture was pressure molded at 12 $ton/cm^2$, and a molded article was thereby produced. After that, the molded article was degreased at a temperature of 300° C. in the air for 3.0 hours.

Furthermore, each of the molded articles of samples 1 to 4 was heated under the conditions shown in FIG. 4. The oxygen partial pressure was controlled by controlling the partial pressure ratio in a mixed atmosphere of $CO_2$ and $H_2$.

In sample 1 according to this example, the primary heat treatment was performed by heating the molded article for 0.5 hours by setting α defining the first oxygen partial pressure to $1.0\times10^{-5}$ and the first temperature to 700° C. Also, the secondary heat treatment was performed by heating the molded article for 1.0 hour by setting α defining the second oxygen partial pressure to 1.9×10 and the second temperature to 900° C.

In sample 2 according to a comparative example, the molded article was heated for 1.0 hour by setting α defining the oxygen partial pressure to $1.0\times10^{-5}$ and the temperature to 900° C.

In sample 3 according to a comparative example, the molded article was heated for 1.0 hour by setting α defining the oxygen partial pressure to 1.9×10 and the temperature to 900° C.

In sample 4 according to a comparative example, the molded article was heated for 1.0 hour in a nitrogen atmosphere by setting the temperature to 900° C.

Also, as shown in FIG. 4, each sample obtained was subjected to initial magnetic permeability measurement and magnetic loss measurement. The initial magnetic permeability was measured by measuring the magnetic permeability of each sample at a frequency of 150 kHz by using an LCR meter. The magnetic loss was measured by measuring the magnetic loss of each sample at a measurement frequency of 100 kHz and a measurement magnetic flux density of 0.1 T by using an alternating current B-H curve measuring apparatus.

In sample 1 according to this example, the initial magnetic permeability was 145, and the magnetic loss was 890 $kW/m^3$.

In sample 2 according to a comparative example, the initial magnetic permeability was 76, and the magnetic loss was 5900 $kW/m^3$.

In sample 3 according to a comparative example, the initial magnetic permeability was 31, and the magnetic loss was 22000 $kW/m^3$.

In sample 4 according to a comparative example, the initial magnetic permeability was 51, and the magnetic loss was 18500 $kW/m^3$.

That is, in sample 1 according to this example, the initial magnetic permeability was greater and the magnetic loss was smaller than those of samples 2 to 4 according to the comparative examples. Accordingly, it is found that composite magnetic body 2 with good initial magnetic permeability and magnetic loss can be obtained by performing the primary heat treatment and the secondary heat treatment on the molded article as the heat treatment as in sample 1 according to this example.

1-3-2. Example 2

In Example 2, evaluation was made on the effects obtained when the heat treatment of molded articles formed by pressure molding metal magnetic materials 20 was performed by changing the conditions for the primary heat treatment while leaving the conditions for the secondary heat treatment unchanged. FIG. 5 is a diagram showing heat treatment conditions and magnetic characteristics of composite magnetic materials of this example and comparative examples. In this example, as composite magnetic bodies 2, samples 5 to 21 shown in FIG. 5 were produced. The produced samples were toroidal cores that had an external diameter of 14 mm, an internal diameter of 10 mm, and a height of about 2 mm. In FIG. 5, samples 6 to 8, 10 to 12, and 14 to 16 are composite magnetic bodies 2 according to this example, and samples 5, 9, 13, and 17 to 21 are composite magnetic bodies 2 according to comparative examples.

Composite magnetic bodies 2 of samples 5 to 21 shown in FIG. 5 were formed under the following conditions.

First, for each of samples 5 to 21, a metal soft magnetic powder made of Si and Fe was prepared as a raw material for making metal magnetic material 20. The metal soft magnetic powder had a composition of 5.6 wt % Si and 94.4 wt % Fe. The metal soft magnetic powder had an average particle size of 18 μm.

In each of samples 5 to 21, 0.8 parts by weight of butyral resin was added to 100 parts by weight of the prepared metal soft magnetic powder. After that, a small amount of ethanol was added thereto, and the resultant was kneaded and dispersed to obtain a mixture. Furthermore, the obtained mixture was pressure molded at 15 ton/$cm^2$, and a molded article was thereby produced. After that, the molded article was degreased at a temperature of 400° C. in the air for 3.0 hours.

Furthermore, each of the molded articles of samples 5 to 21 was heated under the conditions shown in FIG. 5 while changing the first oxygen partial pressure and the first temperature in the primary heat treatment. The oxygen partial pressure was controlled by controlling partial pressure ratio in a mixed atmosphere of $CO_2$ and $H_2$. Also, the primary heat treatment time was set to 1.0 hour.

In samples 5 to 9, α defining the first oxygen partial pressure was set to $4.5\times10^{-6}$. Also, the first temperature was set to 400° C., 500° C., 700° C., 800° C., and 850° C. for samples 5 to 9, respectively. Here, sample 5 and sample 9 are comparative examples.

In samples 10 to 12, α defining the first oxygen partial pressure was set to $5.2\times10^{-5}$. Also, the first temperature was set to 500° C., 600° C., and 700° C. for samples 10 to 12, respectively.

In samples 13 to 17, α defining the first oxygen partial pressure was set to $5.0\times10^{-4}$. Also, the first temperature was set to 300° C., 500° C., 700° C., 800° C., and 850° C. for samples 13 to 17, respectively. Here, sample 13 and sample 17 are comparative examples.

In sample 18, α defining the first oxygen partial pressure was set to $3.8\times10^{-6}$, and the first temperature was set to 500° C. Sample 18 is a comparative example.

In sample 19, α defining the first oxygen partial pressure was set to $3.2\times10^{-6}$, and the first temperature was set to 800° C. Sample 19 is a comparative example.

In samples 20 and 21, α defining the first oxygen partial pressure was set to $4.2\times10^{-3}$. Also, the first temperature was set to 500° C. and 800° C. for samples 20 and 21, respectively. Samples 20 and 21 are comparative examples.

In all of samples 5 to 21, the conditions for the secondary heat treatment were set as follows: α defining the second oxygen partial pressure was 5.0×10, the second temperature was 850° C., and the heat treatment time was 0.5 hours.

Also, as shown in FIG. 5, each sample obtained was subjected to initial magnetic permeability measurement and magnetic loss measurement. The initial magnetic permeability was measured by measuring the magnetic permeability of each sample at a frequency of 150 kHz by using an LCR meter. The magnetic loss was measured by measuring the magnetic loss of each sample at a measurement frequency of 100 kHz and a measurement magnetic flux density of 0.1 T by using an alternating current B-H curve measuring apparatus.

The initial magnetic permeability and the magnetic loss of each sample are shown in FIG. 5. Samples 6 to 8, 10 to 12, and 14 to 16 according to this example exhibited values of 119 or greater in terms of initial magnetic permeability. In contrast, samples 5, 9, 13, and 17 to 21 according to the comparative examples exhibited double-digit values in terms of initial magnetic permeability. That is, in samples 6 to 8, 10 to 12, and 14 to 16 according to this example, the initial magnetic permeability was greater than those of samples 5, 9, 13, and 17 to 21 according to the comparative examples.

Also, samples 6 to 8, 10 to 12, and 14 to 16 according to this example exhibited values of 1000 or less in terms of magnetic loss. In contrast, samples 5, 9, 13, and 17 to 21 according to the comparative examples exhibited values greater than 1000 in terms of magnetic loss. That is, in samples 6 to 8, 10 to 12, and 14 to 16 according to this example, the magnetic loss was smaller than those of samples 5, 9, 13, and 17 to 21 according to the comparative examples.

To be more specific, when comparison is made between samples 6 and 18 in both of which the first temperature was 500° C. in terms of the effects obtained by changing the first oxygen partial pressure, significant differences are observed in terms of initial magnetic permeability and magnetic loss. In contrast, when comparison is made between samples 6 and 10 and between samples 10 and 14 in all of which the first temperature was 500° C., the differences in terms of initial magnetic permeability and magnetic loss are not so much large as the differences between samples 6 and 18 in terms of initial magnetic permeability and magnetic loss.

Also, when comparison is made between samples 8 and 19 in both of which the first temperature was 800° C., significant differences are observed in terms of initial magnetic permeability and magnetic loss, as with the comparison between samples 6 and 18. Also, when comparison is made between samples 14 and 20 in both of which the first temperature was 500° C. and samples 16 and 21 in both of which the first temperature was 800° C., significant differences are observed in terms of initial magnetic permeability and magnetic loss, as with the comparison between samples 6 and 18.

From the foregoing, it can be said that composite magnetic body 2 with a large initial magnetic permeability and a small magnetic loss can be obtained by setting α defining the first oxygen partial pressure to $4.5\times10^{-6}$ or more and $5.0\times10^{-4}$ or less.

Also, when comparison is made between samples 5 and 6 in both of which α defining the first oxygen partial pressure was $4.5 \times 10^{-6}$ in terms of the effects obtained by changing the first temperature, significant differences are observed in terms of initial magnetic permeability and magnetic loss. In contrast, when comparison is made between samples 6 and 7 and between samples 7 and 8 in all of which the first oxygen partial pressure was $4.5 \times 10^{-6}$, the differences in terms of initial magnetic permeability and magnetic loss are not so much large as the differences between samples 5 and 6 in terms of initial magnetic permeability and magnetic loss.

Also, when comparison is made between samples 13 and 14 in both of which α defining the first oxygen partial pressure was $5.0 \times 10^{-4}$, significant differences are observed in terms of initial magnetic permeability and magnetic loss, as with the comparison between samples 5 and 6. Also, when comparison is made between samples 16 and 17 in both of which α defining the first oxygen partial pressure was $5.0 \times 10^{-4}$, significant differences are observed in terms of initial magnetic permeability and magnetic loss, as with the comparison between samples 5 and 6.

From the foregoing, it can be said that composite magnetic body 2 with a large initial magnetic permeability and a small magnetic loss can be obtained by setting the first temperature to 500° C. or more and 800° C. or less.

From the above, it is found that composite magnetic body 2 with good initial magnetic permeability and magnetic loss can be obtained by setting a defining the first oxygen partial pressure to $4.5 \times 10^{-6}$ or more and $5.0 \times 10^{-4}$ or less and the first temperature to 500° C. or more and 800° C. or less in the primary heat treatment of the molded article.

1-3-3. Example 3

In Example 3, evaluation was made on the effects obtained when the heat treatment of molded articles formed by pressure molding metal magnetic materials 20 was performed by changing the conditions for the secondary heat treatment while leaving the conditions for the primary heat treatment unchanged. FIG. 6 is a diagram showing heat treatment conditions and magnetic characteristics of composite magnetic materials of this example and comparative examples. In this example, as composite magnetic bodies 2, samples 22 to 41 shown in FIG. 6 were produced. The produced samples were toroidal cores that had an external diameter of 14 mm, an internal diameter of 10 mm, and a height of about 2 mm. In FIG. 6, samples 23 to 25, 27 to 32, and 34 to 36 are composite magnetic bodies 2 according to this example, and samples 22, 26, 33, and 37 to 41 are composite magnetic bodies 2 according to comparative examples.

Composite magnetic bodies 2 of samples 22 to 41 shown in FIG. 6 were formed under the following conditions.

First, for each of samples 22 to 41, a metal soft magnetic powder made of Si and Fe was prepared as a raw material for making metal magnetic material 20. The metal soft magnetic powder had a composition of 6.0 wt % Si and 94.0 wt % Fe. The metal soft magnetic powder had an average particle size of 25 μm.

In each of samples 22 to 41, 1.0 part by weight of butyral resin was added to 100 parts by weight of the prepared metal soft magnetic powder. After that, a small amount of ethanol was added thereto, and the resultant was kneaded and dispersed to obtain a mixture. Furthermore, the obtained mixture was pressure molded at 18 ton/cm$^2$, and a molded article was thereby produced. After that, the molded article was degreased at a temperature of 400° C. in the air for 3.0 hours.

Furthermore, each of the molded articles of samples 22 to 41 was heated under the conditions shown in FIG. 6 while changing the second oxygen partial pressure and the second temperature in the secondary heat treatment. The oxygen partial pressure was controlled by controlling partial pressure ratio in a mixed atmosphere of $CO_2$ and $H_2$. Also, the secondary heat treatment time was set to 1.0 hour.

In samples 22 to 26, α defining the second oxygen partial pressure was set to $4.5 \times 10^{-3}$. Also, the second temperature was set to 500° C., 600° C., 700° C., 1000° C., and 1100° C. for samples 22 to 26, respectively. Here, samples 22 and 26 are comparative examples.

In samples 27 to 29, α defining the second oxygen partial pressure was set to $1.4 \times 10^{-2}$. Also, the second temperature was set to 700° C., 800° C., and 900° C. for samples 27 to 29, respectively.

In samples 30 to 32, α defining the second oxygen partial pressure was set to 2.1×10. Also, the second temperature was set to 700° C., 800° C., and 950° C. for samples 30 to 32, respectively.

In samples 33 to 37, α defining the second oxygen partial pressure was set to $6.0 \times 10^{3}$, and the second temperature was set to 400° C., 600° C., 800° C., 1000° C., and 1050° C. Samples 33 and 37 are comparative examples.

In samples 38 and 39, α defining the second oxygen partial pressure was set to $1.4 \times 10^{-3}$. Also, the second temperature was set to 600° C. and 1000° C. for samples 38 and 39, respectively. Samples 38 and 39 are comparative examples.

In samples 40 and 41, α defining the second oxygen partial pressure was set to $1.0 \times 10^{4}$. Also, the second temperature was set to 600° C. and 1000° C. for samples 40 and 41, respectively. Samples 40 and 41 are comparative examples.

In all of samples 22 to 41, the conditions for the primary heat treatment were set as follows: α defining the first oxygen partial pressure was $9.0 \times 10^{-6}$, the first temperature was 600° C., and the heat treatment time was 1.0 hour.

Also, as shown in FIG. 6, each sample obtained was subjected to initial magnetic permeability measurement and magnetic loss measurement. The initial magnetic permeability was measured by measuring the magnetic permeability of each sample at a frequency of 150 kHz by using an LCR meter. The magnetic loss was measured by measuring the magnetic loss of each sample at a measurement frequency of 100 kHz and a measurement magnetic flux density of 0.1 T by using an alternating current B-H curve measuring apparatus.

The initial magnetic permeability and the magnetic loss of each sample are shown in FIG. 6. Samples 23 to 25, 27 to 32, and 34 to 36 according to this example exhibited values of 100 or greater in terms of initial magnetic permeability. In contrast, samples 22, 26, 33, and 37 to 41 according to the comparative examples exhibited double-digit values in terms of initial magnetic permeability. That is, in samples 23 to 25, 27 to 32, and 34 to 36 according to this example, the initial magnetic permeability was greater than those of samples 22, 26, 33, and 37 to 41 according to the comparative examples.

Also, samples 23 to 25, 27 to 32, and 34 to 36 according to this example exhibited values of 1700 or less in terms of magnetic loss. In contrast, samples 22, 26, 33, and 37 to 41 according to the comparative examples exhibited values of 2200 or greater in terms of magnetic loss. That is, in samples 23 to 25, 27 to 32, and 34 to 36 according to this example, the magnetic loss was smaller than those of samples 22, 26, 33, and 37 to 41 according to the comparative examples.

To be more specific, when comparison is made between samples 23 and 38 in both of which the second temperature was 600° C. in terms of the effects obtained by changing the second oxygen partial pressure, significant differences are observed in terms of initial magnetic permeability and magnetic loss. In contrast, when comparison is made between samples 23 and 34 in both of which the second temperature was 600° C., the differences in terms of initial magnetic permeability and magnetic loss are not so much large as the differences between samples 23 and 38 in terms of initial magnetic permeability and magnetic loss. Also, when comparison is made between samples 34 and 40 in both of which the second temperature was 600° C., significant differences are observed in terms of initial magnetic permeability and magnetic loss, as with the comparison between samples 23 and 38.

Also, when comparison is made between samples 25 and 39 in both of which the second temperature was 1000° C., significant differences are observed in terms of initial magnetic permeability and magnetic loss, as with the comparison between samples 23 and 38. Also, when comparison is made between samples 36 and 41 in both of which the second temperature was 1000° C., significant differences are observed in terms of initial magnetic permeability and magnetic loss, as with the comparison between samples 25 and 39.

From the foregoing, it can be said that composite magnetic body 2 with a large initial magnetic permeability and a small magnetic loss can be obtained by setting α defining the second oxygen partial pressure to $4.5\times10^{-3}$ or more and $6.0\times10^{3}$ or less.

Also, when comparison is made between samples 22 and 23 in both of which α defining the second oxygen partial pressure was $4.5\times10^{-3}$ in terms of the effects obtained by changing the second temperature, significant differences are observed in terms of initial magnetic permeability and magnetic loss. In contrast, when comparison is made between samples 23 and 24 and between samples 24 and 25 in all of which α defining the second oxygen partial pressure was $4.5\times10^{-3}$, the differences in terms of initial magnetic permeability and magnetic loss are not so much large as the differences between samples 22 and 23 in terms of initial magnetic permeability and magnetic loss.

Also, when comparison is made between samples 25 and 26 in both of which α defining the second oxygen partial pressure was $4.5\times10^{-3}$, significant differences are observed in terms of initial magnetic permeability and magnetic loss, as with the comparison between samples 22 and 23. When comparison is made between samples 33 and 34 in both of which α defining the second oxygen partial pressure was $6.0\times10^{3}$, and between samples 36 and 37 in both of which α defining the second oxygen partial pressure was $6.0\times10^{3}$, significant differences are observed in terms of initial magnetic permeability and magnetic loss, as with the comparison between samples 22 and 23.

From the foregoing, it can be said that composite magnetic body 2 with a large initial magnetic permeability and a small magnetic loss can be obtained by setting the second temperature to 600° C. or more and 1000° C. or less.

From the above, it is found that composite magnetic body 2 with good initial magnetic permeability and magnetic loss can be obtained by setting a defining the second oxygen partial pressure to $4.5\times10^{-3}$ or more and $6.0\times10^{3}$ or less and the second temperature to 600° C. or more and 1000° C. or less in the secondary heat treatment of the molded article.

1-4. Magnetic Characteristics of Composite Magnetic Body

Hereinafter, the magnetic characteristics of composite magnetic body 2, and the significance of the primary heat treatment and the secondary heat treatment will be described.

In general, in a metal-based composite magnetic body, hysteresis loss and eddy current loss are primary causes of magnetic loss in the composite magnetic body. Where magnetic loss is represented by PL, hysteresis loss is represented by Ph, and eddy current loss is represented by Pe, magnetic loss PL is expressed by Equation 2 given below.

$$PL=Ph+Pe+Pr \qquad \text{Equation 2}$$

In Equation 2, Pr represents residual loss other than hysteresis loss and eddy current loss.

Here, where measurement magnetic flux density is represented by Bm, measurement frequency is represented by f, specific resistance value is represented by p, and eddy current size is represented by d, magnetic loss PL is expressed by Equation 3 given below.

$$PL=Kh\cdot Bm^3\cdot f+Ke\cdot Bm^2\cdot f\cdot d^2/\rho+Pr \qquad \text{Equation 3}$$

In Equation 3, Kh and Ke are constants.

From Equation 2 and Equation 3, hysteresis loss Ph is expressed by $Ph=Kh\cdot Bm^3\cdot f$, and eddy current loss Pe is expressed by $Pe=Ke\cdot Bm^2\cdot f^2\cdot d^2/\rho$.

Here, hysteresis loss Ph and eddy current loss Pe both include measurement frequency f as a parameter, and thus the values of hysteresis loss Ph and eddy current loss Pe depend on the frequency at which the composite magnetic body is used. In particular, eddy current loss Pe includes $f^2$ as a parameter, and is thus significantly affected by a frequency change. Accordingly, in the case where the composite magnetic body is used in a high frequency band, in particular, eddy current loss becomes a problem, and thus the composite magnetic body is required to have a configuration that suppresses the occurrence of eddy current.

In order to suppress the occurrence of eddy current, as mentioned in the background art section, a method may be conceived in which the surface of the metal magnetic material is covered with an insulating film. As a result of the surface of the metal magnetic material being covered with an insulating film, the insulating film is present between a plurality of magnetic material particles, and thus eddy current does not flow between the plurality of magnetic material particles, as a result of which the eddy current path is shortened. It is thereby possible to reduce eddy current loss in the composite magnetic material. In order to form an insulating film on the surface of the metal magnetic material, for example, a method may be used in which the composite magnetic material is subjected to a heat treatment to form an oxide film on the surface of the composite magnetic material.

Figure 7:
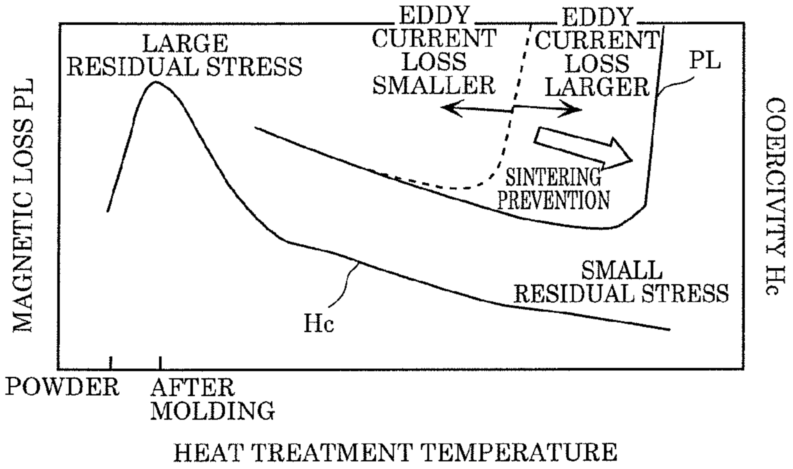
FIG. 7 is a diagram showing a relationship between heat treatment temperature, magnetic loss, and coercivity of a composite magnetic material.

FIG. 7 is a diagram showing a relationship between heat treatment temperature, magnetic loss, and coercivity of a composite magnetic material. As shown in FIG. 7, magnetic loss PL decreases as the heat treatment temperature of the composite magnetic material is increased. Accordingly, it can be said that heating the composite magnetic material at a high temperature is an effective method to reduce magnetic loss PL.

Also, in the case where the composite magnetic material is heated at a high temperature, the insulating coating film formed on the surface of the metal magnetic material may be damaged. In the graph of magnetic loss PL shown in FIG. 7, the dashed line indicates the case where the insulating coating film is damaged when the composite magnetic material is heated at a high temperature. Once the insulating coating film is damaged, eddy current flows through a plurality of composite magnetic material particles, and the eddy current path increases, as a result of which magnetic loss PL increases rapidly.

From this point, it is difficult to set and adjust the heat treatment temperature of the composite magnetic material, and thus conventionally the heat treatment temperature of the composite magnetic material has been set to a temperature of 800° C. or less. However, in order to sufficiently relieve residual stress, it is required to increase the heat treatment temperature to a temperature of about 1000° C. that is higher than the conventionally used heat treatment temperature. Accordingly, a technique is required with which it is possible to form an insulating coating film on the surface of the metal magnetic material and heat the composite magnetic material at a temperature at which the insulating coating film is not damaged, without making the insulating coating film too thick.

To this end, as described above, in the present embodiment, a primary heat treatment and a secondary heat treatment are provided as the heat treatment. In the primary heat treatment, the heat treatment temperature (first temperature) is set to 500° C. or more and 800° C. or less, and in the secondary heat treatment, the heat treatment temperature (second temperature) is set to 600° C. or more and 1000° C. or less. Also, in the primary heat treatment, α defining the oxygen partial pressure (first oxygen partial pressure) is set to $4.5\times10^{-6}$ or more and $5.0\times10^{-4}$ or less. Also, in the secondary heat treatment, α defining the oxygen partial pressure (second oxygen partial pressure) is set to $4.5\times10^{-3}$ or more and $6.0\times10^{3}$ or less.

By setting the first temperature of the primary heat treatment to a temperature in a conventionally used range of about 500° C. or more and 800° C. or less, Si atoms of Fe—Si-based metal magnetic material 20 that forms composite magnetic body 2 are bonded to oxygen, and Si oxide coating film 22 is formed on the surface of the composite magnetic body. Accordingly, metal magnetic material 20 is insulated by Si oxide coating film 22.

Also, by setting the second temperature of the secondary heat treatment to 600° C. or more and 1000° C. or less that is higher than the first temperature, residual stress in composite magnetic body 2 can be sufficiently relieved. Also, Si oxide coating film 22 has already been formed on the surface of metal magnetic material 20 through the primary heat treatment, and thus oxidation is unlikely to further proceed in metal magnetic material 20, and a situation is suppressed in which Si oxide coating film 22 is made thick and extends to the inside of metal magnetic material 20.

Also, although Si oxide coating film 22 is not further formed in the secondary heat treatment, because the second oxygen partial pressure is set to be higher than the first oxygen partial pressure, oxidation tends to proceed. Accordingly, Fe in metal magnetic material 20 is deposited on the surface of Si oxide coating film 22, and Fe atoms are bonded to oxygen. As a result, Fe oxide layer 24 is formed on the surface of Si oxide coating film 22. Because Fe oxide layer 24 is formed, Si oxide coating film 22 is reinforced. Accordingly, even when metal magnetic material 20 is heated at a high temperature, Si oxide coating film 22 is not damaged, and thus the insulation of the surface of metal magnetic material 20 can be maintained. With this configuration, it is possible to reduce eddy current loss in metal magnetic material 20. Accordingly, a composite magnetic body that has high magnetic characteristics can be achieved.

It is sufficient that Fe oxide layer 24 is formed at least partially on the surface of Si oxide coating film 22. Fe oxide layer 24 may entirely cover the surface of Si oxide coating film 22.

1-5. Advantageous Effects, Etc.

The method for producing a composite magnetic body according to the present embodiment includes: pressure molding a metal magnetic material into a predetermined shape, the metal magnetic material being an Fe—Si-based metal magnetic material; performing a primary heat treatment of heating the metal magnetic material in an atmosphere with a first oxygen partial pressure to form an Si oxide coating film on a surface of the metal magnetic material; and performing a secondary heat treatment of heating the metal magnetic material that has undergone the primary heat treatment in an atmosphere with a second oxygen partial pressure, which is higher than the first oxygen partial pressure, to form an Fe oxide layer at least partially on a surface of the Si oxide coating film.

With this configuration, as the heat treatment of the composite magnetic body made of Fe—Si-based metal magnetic material, a primary heat treatment in which heating is performed in an atmosphere with a first oxygen partial pressure and a secondary heat treatment in which heating is performed in an atmosphere with a second oxygen partial pressure that is higher than the first oxygen partial pressure are provided, and thus an Si oxide coating film is first formed on the surface of the metal magnetic material, and an Fe oxide layer is formed on the surface of the Si oxide coating film. As a result, the Si oxide coating film is reinforced by the Fe oxide layer, and thus is unlikely to be damaged. Accordingly, the insulation of the metal magnetic material can be maintained by the Si oxide coating film, and it is therefore possible to provide a composite magnetic body that has high magnetic characteristics.

Also, the metal magnetic material may be heated at a first temperature in the primary heat treatment, and the metal magnetic material may be heated at a second temperature that is higher than the first temperature in the secondary heat treatment.

With this configuration, an Si oxide coating film can be formed on the surface of the metal magnetic material by heating the metal magnetic material at the first temperature, and an Fe oxide layer can be formed on the surface of the Si oxide coating film without causing damage to the Si oxide coating film by heating the metal magnetic material at a second temperature that is higher than the first temperature. Accordingly, the insulation of the metal magnetic material can be maintained by the Si oxide coating film, and it is therefore possible to provide a composite magnetic body that has high magnetic characteristics.

Also, the pressure molding and a degreasing treatment of degreasing the metal magnetic material that has undergone the pressure molding may be performed prior to the primary heat treatment, and the secondary heat treatment may be performed successively after the primary heat treatment.

With this configuration, a composite magnetic body can be formed from an Fe—Si-based metal magnetic material, without forming a metal magnetic material powder in which the metal magnetic material is covered with an Si oxide coating film and an Fe oxide layer. Accordingly, the process for producing a composite magnetic body can be simplified.

Also, after the secondary heat treatment is performed successively after the primary heat treatment, the pressure molding may be performed, and after the pressure molding is performed, a strain relief treatment of relieving a strain of the metal magnetic material may be further performed at a third temperature that is substantially equal to the second temperature.

With this configuration, the insulation of the metal magnetic material can be maintained by the Si oxide coating film during the production process, and a magnetic powder that has high magnetic characteristics is formed. Accordingly, a composite magnetic body that has any type of shape can be formed by pressure molding the magnetic powder. It is therefore possible to provide a composite magnetic body that has any type of shape and high magnetic characteristics.

Also, the magnetic powder according to the present embodiment includes: a metal magnetic material that is an Fe—Si-based metal magnetic material; an Si oxide coating film that covers a surface of the metal magnetic material; and an Fe oxide layer that is formed at least partially on a surface of the Si oxide coating film.

With this configuration, it is possible to provide a magnetic powder that has high magnetic characteristics.

Also, the composite magnetic body according to the present embodiment is a composite magnetic body obtained by pressure molding a plurality of magnetic powder particles that have the above-described features into a predetermined shape.

With this configuration, it is possible to provide a composite magnetic body that has high magnetic characteristics.

Also, the coil component according to the present embodiment includes a composite magnetic body that has the above-described features, and a conductor that is wound around the composite magnetic body.

With this configuration, it is possible to provide a coil component that has high magnetic characteristics.

Embodiment 2

Next, Embodiment 2 will be described. In Embodiment 1, composite magnetic body 2 obtained by pressure molding metal magnetic material 20 has been described as an example, but in the present embodiment, magnetic powder 20*a* made of metal magnetic material 20 will be described.

2-1. Configuration of Magnetic Powder

Figure 8:
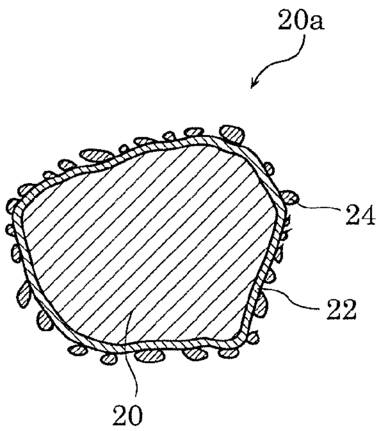
FIG. 8 is a cross-sectional view showing a configuration of a magnetic powder according to Embodiment 2.

FIG. 8 is a cross-sectional view showing a configuration of magnetic powder 20*a* according to the present embodiment. As shown in FIG. 8, magnetic powder 20*a* is made of Fe—Si-based metal magnetic material 20, as with composite magnetic body 2 shown in Embodiment 1. Si oxide coating film 22 is formed on the surface of metal magnetic material 20. Also, Fe oxide layer 24 is formed at least partially on the surface of Si oxide coating film 22.

As in Embodiment 1, Fe—Si-based metal magnetic material 20 is composed mainly of Fe and Si, and similar effects can be obtained even when metal magnetic material 20 contains inevitable impurities. In the present embodiment, Si has functions of forming Si oxide coating film 22 through a heat treatment and improving soft magnetic characteristics. The addition of Si provides advantageous effects of reducing the magnetic anisotropy and magnetostriction constant, increasing electric resistance, and reducing eddy current loss. Si is preferably added in an amount of 1 wt % or more and 8 wt % or less. If Si is added in an amount of less than 1 wt %, the advantageous effect of improving soft magnetic characteristics will be poor. If Si is added in an amount of greater than 8 wt %, saturation magnetization will decrease significantly, which reduces DC superimposition characteristics. There is no particular limitation on the method for making metal magnetic material 20 used in the present embodiment, and various types of atomizing methods and various types of pulverized powders can be used.

Si oxide coating film 22 is made of, for example, $SiO_2$ as with Si oxide coating film 22 shown in Embodiment 1. Si oxide coating film 22 is a coating film formed as a result of the surface of Fe—Si-based metal magnetic material 20 being oxidized. Si oxide coating film 22 covers entirely the surface of metal magnetic material 20. Metal magnetic material 20 is insulated by Si oxide coating film 22.

As with Fe oxide layer 24 shown in Embodiment 1, Fe oxide layer 24 is made of, for example, FeO, $Fe_2O_3$, $Fe_3O_4$, or the like. Fe oxide layer 24 is a layer formed as a result of Fe being deposited and reaching the surface of Si oxide coating film 22. Fe oxide layer 24 is formed at least partially on the surface of Si oxide coating film 22. Due to the presence of Fe oxide layer 24, Si oxide coating film 22 is reinforced, and thus is unlikely to be damaged. Accordingly, the insulation of metal magnetic material 20 is firmly maintained. Fe oxide layer 24 may cover entirely the surface of Si oxide coating film 22.

2-2. Methods for Producing Magnetic Powder and Composite Magnetic Body

Figure 9:
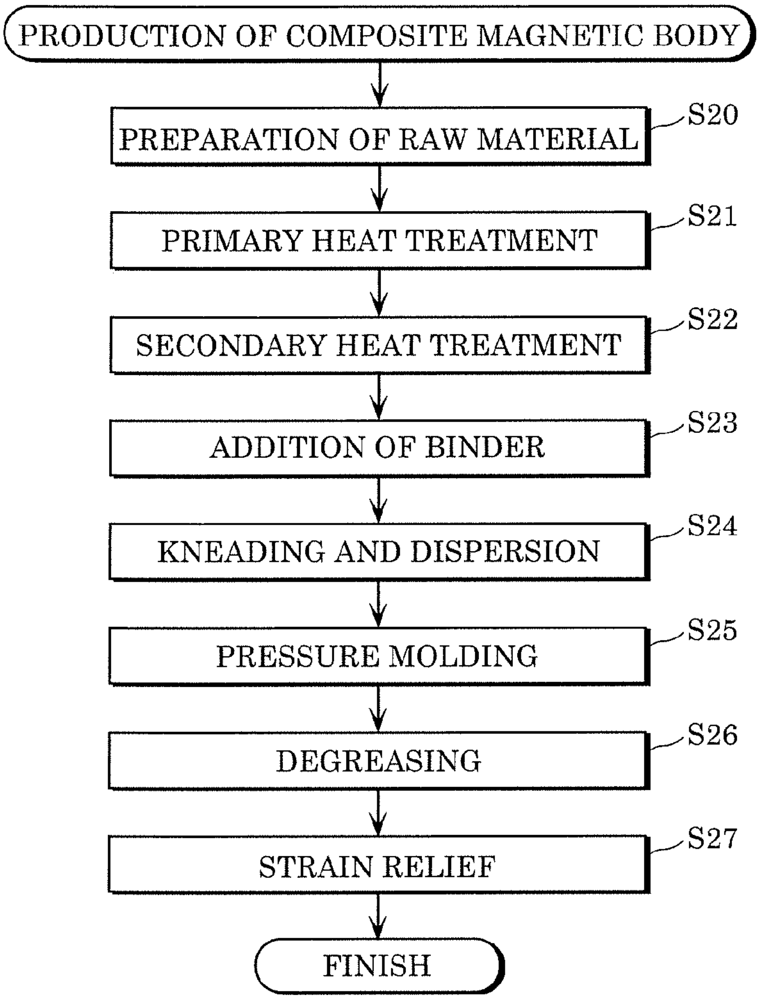
FIG. 9 is a flowchart illustrating a process for producing a magnetic powder according to Embodiment 2.

Hereinafter, a method for producing magnetic powder 20*a* according to the present embodiment, and a method for producing a composite magnetic body using magnetic powder 20*a* will be described. FIG. 9 is a flowchart illustrating a process for producing magnetic powder 20*a* according to the present embodiment.

As shown in FIG. 9, first, a raw material for making metal magnetic material 20 is prepared (step S20). As the raw material for making metal magnetic material 20, for example, a metal soft magnetic powder (Fe—Si metal powder) that is made of an alloy of Fe and Si, with an Si content of 1 wt % or more and 8 wt % or less, is used.

Next, a heat treatment is performed on the metal soft magnetic powder. In the present embodiment, as with the heat treatment of composite magnetic body 2 shown in Embodiment 1, the heat treatment includes a primary heat treatment and a secondary heat treatment. In the primary heat treatment, the pressure molded Fe—Si metal powder is heated at a first oxygen partial pressure and a first temperature (step S21). $\alpha$ defining the first oxygen partial pressure is set to $4.5\times10^{-6}$ or more and $5.0\times10^{-4}$ or less. The first temperature is set to 500° C. or more and 800° C. or less. The primary heat treatment time is set to several tens of minutes to several hours. For example, $\alpha$ defining the first oxygen partial pressure may be set to $9.0\times10^{-6}$, the first temperature may be set to 600° C., and the primary heat treatment time may be set to 1 hour.

As a result of the primary heat treatment being performed, Si oxide coating film 22 is formed on the surface of metal magnetic material 20. Si oxide coating film 22 is an $SiO_2$ film that has a thickness of, for example, about nm. The thickness of Si oxide coating film 22 may be 1 nm or more and 200 nm or less. As a result of Si oxide coating film 22 being formed, oxidation is unlikely to further proceed in magnetic material 20, as a result of which metal magnetic material 20 is insulated by Si oxide coating film 22.

After that, a secondary heat treatment is performed successively after the primary heat treatment (step S22). In the secondary heat treatment, metal magnetic material 20 on which Si oxide coating film 22 has been formed is heated at a second oxygen partial pressure and a second temperature. α defining the second oxygen partial pressure is set to $4.5\times10^{-3}$ or more and $6.0\times10^{3}$ or less. The second temperature is set to 600° C. or more and 1000° C. or less. The secondary heat treatment time is set to several tens of minutes to several hours. For example, α defining the second oxygen partial pressure may be set to 5.0×10, the second temperature may be set to 850° C., and the secondary heat treatment time may be set to 0.5 hours.

Through the secondary heat treatment, Fe contained in metal magnetic material 20 is deposited on the surface of Si oxide coating film 22 that covers the surface of metal magnetic material 20, and Fe oxide layer 24 is formed at least partially on the surface of Si oxide coating film 22. Fe oxide layer 24 is formed in the form of, for example, islands with a thickness of about 50 nm on the surface of Si oxide coating film 22. The thickness of Fe oxide layer 24 may be 10 nm or more 200 nm or less. As a result of Fe oxide layer 24 being formed, Si oxide coating film 22 is reinforced by Fe oxide layer 24, and thus is unlikely to be damaged.

Next, metal magnetic material 20 that has undergone the secondary heat treatment is pressure molded, and a cylindrical composite magnetic body is thereby formed, as with composite magnetic body 2 shown in Embodiment 1.

First, a resin as a binder and an organic solvent for facilitating kneading and dispersion when pressure molding metal magnetic material 20 are also prepared. As the resin, for example, an acrylic resin, a butyral resin, or the like is used. Also, as the organic solvent, for example, toluene, ethanol, or the like is used. The preparation of the resin and the organic solvent is not necessarily performed after the secondary heat treatment, and may be performed in the step of preparing the raw material for making metal magnetic material 20.

Next, each of metal magnetic material 20 that has undergone the heat treatment, the resin, and the organic solvent is weighed. Then, the resin and the organic solvent that have been weighed are added to metal magnetic material 20 that has undergone the heat treatment (step S23), and metal magnetic material 20 is kneaded and dispersed (step S24). The kneading and dispersion of metal magnetic material 20 is performed by placing metal magnetic material 20, the resin, and the organic solvent that have been weighed in a container, and mixing and dispersing them by using a rotary ball mill. The kneading and dispersion of metal magnetic material 20 is not necessarily performed using a rotary ball mill, and any other mixing method may be used. The organic solvent is removed by drying metal magnetic material 20 after metal magnetic material 20 has been kneaded and dispersed.

Next, kneaded and dispersed metal magnetic material 20 is subjected to pressure molding (step S25). To be specific, kneaded and dispersed metal magnetic material 20 is placed in a mold and compressed to produce a molded article. At this time, for example, uniaxial molding is performed at a constant pressure of 6 ton/cm$^2$ or more and 20 ton/cm$^2$ or less. The molded article may have, for example, a cylindrical shape as with the shape of composite magnetic body 2 shown in FIG. 1.

After that, for example, in an inert gas atmosphere such as nitrogen gas or in the air, the molded article is heated at a temperature of 200° C. or more and 450° C. or less so as to perform degreasing (step S26). Through this, the resin that is contained in the molded article and functions as a binder is removed. The degreasing step (step S26) may be omitted. In this case, the resin that is contained in the molded article and functions as a binder is removed in a strain relief treatment performed subsequently (step S27).

Furthermore, in order to relieve the residual stress of pressure molded metal magnetic material 20, a strain relief treatment is performed (step S27). Step S27 is a strain relief step. The strain relief treatment is performed by, for example, heating metal magnetic material 20 at a third temperature in an atmosphere in which α defining the oxygen partial pressure is set to $6.0\times10^{3}$ or less. In the strain relief step, metal magnetic material 20 may be heated in an atmosphere such as nitrogen, argon, or helium. α defining the oxygen partial pressure may exceed $6.0\times10^{3}$. The third temperature may be, for example, 600° C. or more and 1000° C. or less, and is substantially equal to the second temperature. Hysteresis loss Ph of metal magnetic material 20 is thereby reduced.

In the method for producing composite magnetic body 2 shown in Embodiment 1, the strain relief treatment is not provided. The reason is that the secondary heat treatment also functions as the strain relief treatment in the method for producing composite magnetic body 2. As a result of the secondary heat treatment being performed, Fe oxide layer 24 is formed, and the residual stress in metal magnetic material 20 is relieved in composite magnetic body 2. After the strain relief treatment, binder 26 may be impregnated. As binder 26, for example, an epoxy resin may be used. With the use of binder 26, the strength of composite magnetic body 2 can be improved.

Through the steps described above, a composite magnetic body is obtained in which magnetic powder 20*a* is used in which the surface of metal magnetic material 20 is covered by Si oxide coating film 22 and Fe oxide layer 24 is formed at least partially on the surface of Si oxide coating film 22.

Here, an example has been described in which the secondary heat treatment is performed successively after the primary heat treatment, but it is unnecessary to continuously increase the heat treatment temperature from the first temperature to the second temperature as long as the secondary heat treatment is performed after the primary heat treatment. For example, the heat treatment temperature may be temporarily dropped from the first temperature after the primary heat treatment, and thereafter increased to the second temperature in the secondary heat treatment through heating. Alternatively, composite magnetic body 2 may be temporarily exposed to the air between the primary heat treatment and the secondary heat treatment. Alternatively, the secondary heat treatment may be performed when a predetermined length of time elapses after the primary heat treatment.

As described above, according to the method for producing a composite magnetic body of the present embodiment, it is possible to obtain a composite magnetic body that has a large initial magnetic permeability and a small magnetic loss.

(Variations)

As shown in FIG. 1, in the embodiments given above, a configuration is used in which coil component 1 is a toroidal coil, and composite magnetic body 2 has a cylindrical shape. However, coil component 1 and composite magnetic body 2 are not limited to this configuration, and may be changed. For example, the composite magnetic body may be composed of two divided magnetic cores, with a coil portion being provided inside of the two divided magnetic cores.

Figure 10A:
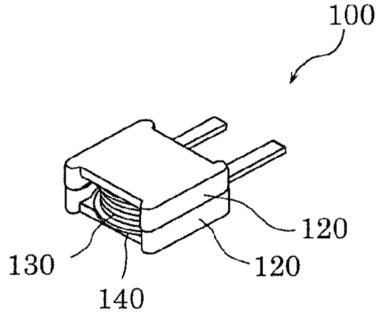
FIG. 10A is a schematic perspective view showing a configuration of a coil component according to a variation.
Figure 10B:
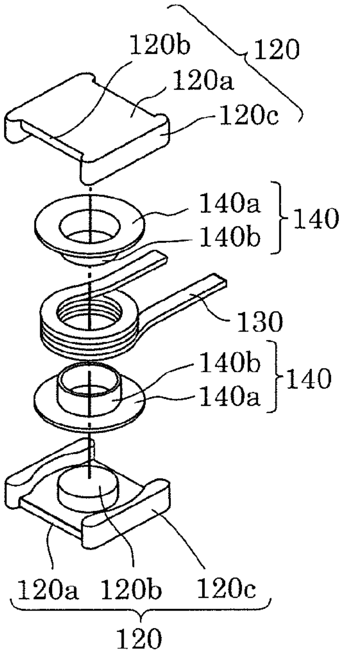
FIG. 10B is an exploded perspective view showing the configuration of the coil component according to the variation.

FIG. 10A is a schematic perspective view showing a configuration of coil component 100 according to a variation. FIG. 10B is an exploded perspective view showing the configuration of coil component 100 according to the variation. As shown in FIGS. 10A and 10B, coil component 100 includes two divided magnetic cores 120, conductor 130, and two coil support bodies 140.

Each of two divided magnetic cores 120 includes base 120*a* and cylindrical core portion 120*b* provided on one surface of base 120*a*. Also, wall portions 120*c* that extend vertically from the edge of base 120*a* are formed on two opposing sides of four sides of base 120*a*. Core portion 120*b* and wall portions 120*c* have the same height from the surface of base 120*a*.

The two divided magnetic cores 120 are assembled such that their core portions 120*b* and wall portions 120*c* come into contact with each other. At this time, conductor 130 is disposed so as to surround core portions 120*b*. Conductor 130 is incorporated in divided magnetic cores 120 via coil support bodies 140.

As shown in FIG. 10B, two coil support bodies 140 each include annular base 140*a* and cylindrical portion 140*b*. Core portion 120*b* of divided magnetic core 120 is disposed within cylindrical portion 140*b*, and conductor 130 is provided on the outer circumference of cylindrical portion 140*b*.

Even in coil component 100 configured as described above, metal magnetic material 20 described above can be used as divided magnetic cores 120. It is thereby possible to improve magnetic loss in divided magnetic cores 120.

Other Embodiments

Although the composite magnetic body and the magnetic powder according to the embodiments and the variation of the present disclosure have been described above, the present disclosure is not limited to the embodiments given above.

For example, the present invention also encompasses a coil component in which the above-described composite magnetic body is used. The coil component may be, for example, an inductance component such as a high-frequency reactor, an inductor, or a transformer. The present invention also encompasses a power supply apparatus that includes the above-described coil component.

Also, the raw material for making metal magnetic material 20 and the composition ratio are not limited to the above-described combination, and may be changed as appropriate. Furthermore, in the method for producing composite magnetic body 2, the first oxygen partial pressure, the first temperature, the second oxygen partial pressure, and the second temperature are not limited to the above-described values, and may be changed as appropriate.

Also, in the method for producing a composite magnetic body, the resin used as a binder in the metal magnetic material, and the organic solvent are not limited to those listed above, and may be changed as appropriate.

Also, in the method for kneading and dispersing the Fe—Si-based metal magnetic material, and the method for mixing the metal magnetic material, the resin, the organic solvent, and the like are not limited to the above-described kneading and dispersion using a rotary ball mill, and any other mixing method may be used.

Also, an example has been described in which the secondary heat treatment is performed successively after the primary heat treatment, but it is unnecessary to continuously increase the heat treatment temperature from the first temperature to the second temperature as long as the secondary heat treatment is performed after the primary heat treatment. For example, the heat treatment temperature may be temporarily dropped from the first temperature after the primary heat treatment, and thereafter increased to the second temperature in the secondary heat treatment through heating. Alternatively, composite magnetic body 2 may be temporarily exposed to the air between the primary heat treatment and the secondary heat treatment. Alternatively, the secondary heat treatment may be performed when a predetermined length of time elapses after the primary heat treatment.

Also, the method for performing the primary heat treatment and the secondary heat treatment, or in other words, the heat treatment method is not limited to the above-described method, and any other method may be used. Furthermore, the above-described pressure, temperature, and time used in each step are merely examples, and it is possible to use any other pressure, temperature, and time.

Also, the present disclosure is not limited to the embodiments described herein. Other embodiments obtained by making various modifications that can be conceived by a person having ordinary skill in the art to the above embodiments as well as embodiments constructed by combining structural elements of different embodiments without departing from the scope of the present disclosure are also included within the scope of the one or more aspects.

INDUSTRIAL APPLICABILITY

The magnetic material according to the present disclosure is applicable as a material for a magnetic core in a high-frequency inductor or a transformer.

REFERENCE MARKS IN THE DRAWINGS

1, 100 coil component
2 composite magnetic body
3, 130 conductor
20 metal magnetic material
20*a* magnetic powder
22 Si oxide coating film
24 Fe oxide layer
26 binder
120 divided magnetic core (composite magnetic body)
120*a* base
120*b* core portion
120*c* wall portion
140 coil support body
140*a* base
140*b* cylindrical portion
m.

The invention claimed is:

1. A magnetic powder, comprising:
a metal magnetic material that is an Fe—Si-based metal magnetic material;
an Si oxide coating film that covers a surface of the metal magnetic material; and
an Fe oxide layer that is formed at least partially on a surface of the Si oxide coating film.

2. A composite magnetic body comprising:
a plurality of particles of the magnetic powder according to claim 1, and
a resin binder impregnated in the composite magnetic body and present between adjacent ones of the plurality of particles, wherein:
the composite magnetic body is obtained by pressure molding the plurality of particles into a predetermined shape, and
the resin binder contacts the Fe oxide layer in regions where the Fe oxide layer is present.

3. A coil component, comprising:

the composite magnetic body according to claim 2; and a conductor that is wound around the composite magnetic body.

* * * * *